(12) United States Patent
Tang et al.

(10) Patent No.: US 10,761,259 B2
(45) Date of Patent: Sep. 1, 2020

(54) LIGHT GUIDE ASSEMBLY, LIGHT COLLIMATION ASSEMBLY, BACKLIGHT MODULE AND DISPLAY DEVICE

(71) Applicants: Hefei BOE Optoelectronics Technology Co., Ltd., Hefei, Anhui (CN); BOE Technology Group Co., Ltd., Beijing (CN)

(72) Inventors: Hai Tang, Beijing (CN); Jingbin Jie, Beijing (CN); Liang Gao, Beijing (CN); Bing Zhang, Beijing (CN); Xiaolin Geng, Beijing (CN); Lu Gao, Beijing (CN); Bo Han, Beijing (CN); Jianwei Qin, Beijing (CN)

(73) Assignees: Hefei BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/527,304

(22) Filed: Jul. 31, 2019

(65) Prior Publication Data

US 2020/0132913 A1    Apr. 30, 2020

(30) Foreign Application Priority Data

Oct. 26, 2018   (CN) .......................... 2018 1 1257793

(51) Int. Cl.
*F21V 8/00*    (2006.01)
*G02B 27/30*    (2006.01)

(52) U.S. Cl.
CPC ......... *G02B 6/0053* (2013.01); *G02B 6/0036* (2013.01); *G02B 27/30* (2013.01)

(58) Field of Classification Search
CPC .......................... G02B 6/0036; G02B 6/0053
See application file for complete search history.

(56) References Cited

U.S. PATENT DOCUMENTS

| 5,303,322 | A  | * | 4/1994 | Winston | .................... | F21V 5/02 |
|---|---|---|---|---|---|---|
|  |  |  |  |  |  | 385/129 |
| 2011/0299013 | A1 | * | 12/2011 | Ishida | .................. | G02B 6/0038 |
|  |  |  |  |  |  | 349/65 |
| 2014/0140091 | A1 | * | 5/2014 | Vasylyev | ............... | G02B 6/001 |
|  |  |  |  |  |  | 362/606 |
| 2014/0146561 | A1 | * | 5/2014 | Yuki | .................... | G02B 6/0035 |
|  |  |  |  |  |  | 362/606 |
| 2014/0146562 | A1 | * | 5/2014 | Ishida | .................. | G02B 6/0038 |
|  |  |  |  |  |  | 362/606 |

* cited by examiner

*Primary Examiner* — Alexander K Garlen
(74) *Attorney, Agent, or Firm* — Banner & Witcoff, Ltd.

(57) ABSTRACT

A light guide assembly, a light collimation assembly, a backlight module and a display device are provided. The light guide assembly includes a first prism sheet, a dielectric layer and a second prism sheet sequentially laminated, a light refractive index of the dielectric layer is smaller than that of the first prism sheet and that of the second prism sheet, the first prism sheet includes a light incident side surface, and a first plane and a first prism surface, the first plane is closer to the dielectric layer, and the first prism surface includes first prism portions extending along a second direction, the second prism sheet includes a second plane and a second prism surface, the second plane is closer to the dielectric layer, the second prism surface includes second prism portions extending along the second direction, and the second prism portion has a reflection surface.

17 Claims, 7 Drawing Sheets

LIGHT GUIDE ASSEMBLY, LIGHT COLLIMATION ASSEMBLY, BACKLIGHT MODULE AND DISPLAY DEVICE

CROSS REFERENCE TO RELATED APPLICATIONS

The present application claims priority of Chinese Patent Application No. 201811257793.X filed on Oct. 26, 2018, the disclosure of which is incorporated herein by reference in its entirety as part of the present application.

TECHNICAL FIELD

Embodiments of the present disclosure relate to a light guide assembly, a light collimation assembly, a backlight module and a display device.

BACKGROUND

A Light Guide Plate (LGP) is a functional element capable of changing a point light source or a line light source into a surface light source, and generally, some light guide structures are utilized to improve utilization efficiency of light. The LGP, for example, may be applied in fields of lighting, display and the like.

A light collimation element can change divergent light into collimated light. Generally speaking, light emerging from a light source is divergent, and thus, the divergent light may be collimated towards a certain direction by utilizing the light collimation element to change the divergent light into the collimated light propagated in parallel along a specific direction, so that utilization efficiency of the light can be improved.

SUMMARY

At least one embodiment of the present disclosure provides a light guide assembly, the light guide assembly comprises: a first prism sheet, a dielectric layer and a second prism sheet which are sequentially laminated along a first direction, a light refractive index of the dielectric layer is smaller than a light refractive index of the first prism sheet and a light refractive index of the second prism sheet; the first prism sheet includes a light incident side surface, and a first plane and a first prism surface which are opposite to each other, the first plane is closer to the dielectric layer with respect to the first prism surface, and the first prism surface includes a plurality of first prism portions extending along a second direction; the second prism sheet includes a second plane and a second prism surface which are opposite to each other, the second plane is closer to the dielectric layer with respect to the second prism surface, the second prism surface includes a plurality of second prism portions extending along the second direction, and the second prism portion has a reflection surface; the first prism sheet is configured to receive light being incident to the light incident side surface, totally reflect light with an included angle not smaller than a first angle with a surface of the dielectric layer by the first prism portion, and reduce an included angle between the light being totally reflected and the first direction; and the second prism sheet is configured to enable light incident to the second prism portion through the second plane to be reflected towards the first direction by the reflection surface of the second prism portion and emerge from the first prism surface, the second direction is parallel to the light incident side surface, and the first angle is a total reflection critical angle between the first prism sheet and the dielectric layer.

For example, in the light guide assembly provided by at least one embodiment of the present disclosure, the first prism portion includes a first prism portion surface positioned on a side of the first prism sheet, which is away from the dielectric layer, a first included angle between a tangent plane at each point in the first prism portion surface and the first plane is $\gamma 1$, where $0° < \gamma 1 \leq 10°$, and a vertex of the first included angle is away from the light incident side surface.

For example, in the light guide assembly provided by at least one embodiment of the present disclosure, the first prism portion surface is an inclined plane or a curved surface; or the first prism portion plane includes a plurality of inclined plane portions, and two adjacent inclined plane portions in the plurality of inclined plane portions have different first included angle.

For example, in the light guide assembly provided by at least one embodiment of the present disclosure, the first prism portion further includes a second prism portion surface intersecting with the first prism portion surface, a second included angle between a tangent plane at each point in the second prism portion surface and the first plane is $\gamma 2$, where $15° < \gamma 2 \leq 90°$, and a vertex of the second included angle is close to the light incident side surface.

For example, in the light guide assembly provided by at least one embodiment of the present disclosure, the first prism surface further includes a plurality of first plane portions, each of the plurality of first plane portions is positioned between the adjacent first prism portions.

For example, in the light guide assembly provided by at least one embodiment of the present disclosure, the first prism portion is of a block shape, and an arrangement density of the first prism portion is increased along a direction away from the light incident side surface.

For example, in the light guide assembly provided by at least one embodiment of the present disclosure, the first prism portion is of a strip shape, at least two first prism portions are different in width in a third direction, and/or, at least two first plane portions are different in width in the third direction, wherein the third direction is perpendicular to the second direction.

For example, in the light guide assembly provided by at least one embodiment of the present disclosure, a main cross-section of the first prism portion along the first direction is of a triangle shape.

For example, in the light guide assembly provided by at least one embodiment of the present disclosure, the first prism portion surface is a first sub prism surface, the first prism portion further includes a second sub prism surface, the second sub prism surface intersects with the first sub prism surface, and an included angle $\alpha_2$ between a plane where the second sub prism surface is positioned and the first plane is $15° \leq \alpha_2 \leq 90°$.

For example, in the light guide assembly provided by at least one embodiment of the present disclosure, in a direction which is parallel to the third direction and is away from the light incident side surface, a width of the first prism portion is set to be gradually increased, and/or a width of the first plane portion is gradually decreased.

For example, in the light guide assembly provided by at least one embodiment of the present disclosure, the plurality of second prism portions are continuously disposed on the second prism surface.

For example, in the light guide assembly provided by at least one embodiment of the present disclosure, a main cross-section of the second prism portion is of a triangle shape.

For example, in the light guide assembly provided by at least one embodiment of the present disclosure, the second prism portion includes a third sub prism surface, the third sub prism surface is configured as the reflection surface, a vertex of an included angle $\alpha_3$ between a plane where the third sub prism surface is positioned and the second plane is away from the light incident side surface, and the included angle $\alpha_3$ is calculated by a formula below:

$$\alpha 3 = \frac{1}{2}\arcsin\left[\frac{n1}{n3} \times \sin\left(\arcsin\left(\frac{n2}{n1}\right) - \alpha 1\right)\right]$$

where n1 represents a refractive index of the first prism sheet, n2 represents a refractive index of the dielectric layer, and n3 represents a refractive index of the second prism sheet.

For example, in the light guide assembly provided by at least one embodiment of the present disclosure, the second prism portion further includes a fourth sub prism surface, the fourth sub prism surface intersects with the third sub prism surface, and an included angle $\alpha_4$ between a plane where the fourth sub prism surface is positioned and the second plane is $30° \leq \alpha_4 \leq 90°$.

For example, in the light guide assembly provided by at least one embodiment of the present disclosure, a material of the dielectric layer includes an optical clear adhesive, and a refractive index the first prism sheet and a refractive index the second prism sheet are identical.

At least one embodiment of the present disclosure provides a light collimation assembly, the light collimation assembly comprises: the light guide assembly as mentioned above, and a collimation part, laminated with the light guide assembly along the first direction and arranged on a side of the light guide assembly where the first prism sheet is arranged, the collimation part is configured to receive light emerging from the first prism sheet of the light guide assembly, collimate a portion of the light, which is propagated along the second direction, towards the first direction and enable the collimated light to emerge.

For example, in the light collimation assembly provided by at least one embodiment of the present disclosure, the collimation part includes a grating layer, the grating layer includes a grating strip extending the third direction, and the grating layer is arranged on a side of the collimation part, which is close to the light guide assembly, or a side of the collimation part, which is away from the light guide assembly, wherein the third direction is perpendicular to the second direction.

For example, in the light collimation assembly provided by at least one embodiment of the present disclosure, a cross section of the grating strip along the second direction is of a trapezoid shape, and a side surface of the grating strip has a reflection layer; or, a cross section of the grating strip along the second direction is of a rectangle shape, and a material of the grating strip is a light absorption material.

For example, in the light collimation assembly provided by at least one embodiment of the present disclosure, At least one embodiment of the present disclosure provides a backlight module, the backlight module comprises: the light guide assembly as mentioned above or the light collimation assembly as mentioned above; and a light source, which is arranged on a side of the first prism sheet where the light incident side surface is positioned.

At least one embodiment of the present disclosure provides a display device, the display device comprises the backlight module as mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
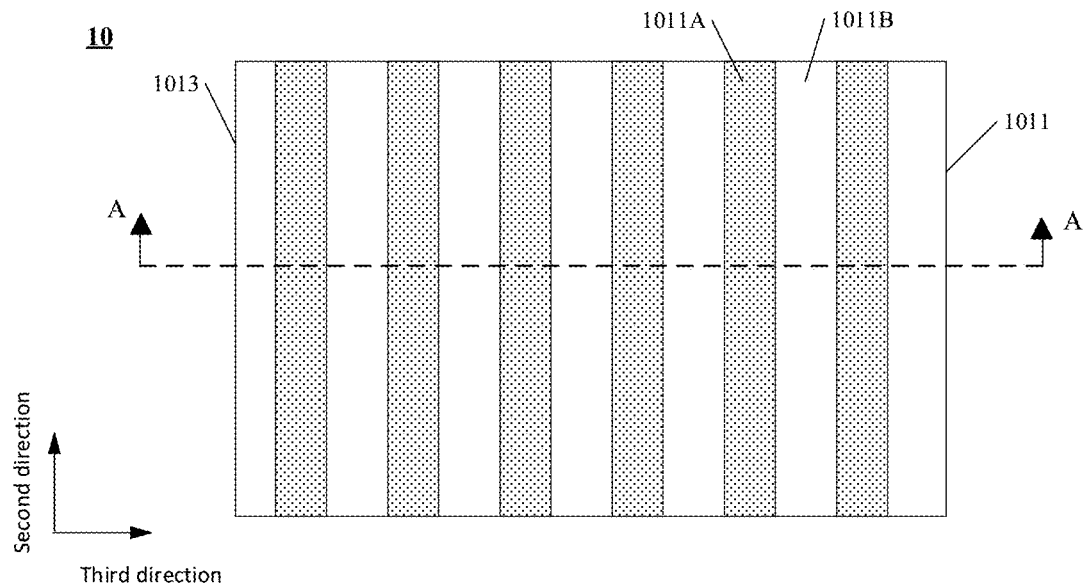
FIG. 1 is a planar schematic diagram of a light guide assembly provided by an embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," or the like are only used to indicate relative position relationship, and when the position of the object which is described is changed, the relative position relationship may be changed accordingly.

In application that an LGP changes a point light source or a line light source into a surface light source, due to reasons of limitation to an LGP structure and the like, brightness of light emerging from the LGP is limited and is not uniform enough. In addition, light emerging from a light emergent surface of the LGP is also divergent generally, and thus, a utilization rate of the light is also relatively low. By utilizing a light collimation element, the light can be collimated towards a certain direction to change a propagation direction of the light and meanwhile, the utilization rate of the light can be improved, but the existing light collimation element only may collimate incident light in one direction, and thus, the collimation effect is limited.

At least one embodiment of the present disclosure provides a light guide assembly. The light guide assembly includes: a first prism sheet, a dielectric layer and a second prism sheet which are sequentially laminated along a first direction, wherein a light refractive index of the dielectric layer is smaller than that of the first prism sheet and that of the second prism sheet; the first prism sheet includes a light incident side surface and a first plane and a first prism surface which are opposite to each other, the first plane is closer to the dielectric layer with respect to the first prism surface, and the first prism surface includes a plurality of first prism portions extending along a second direction; the second prism sheet includes a second plane and a second prism surface which are opposite to each other, the second plane is closer to the dielectric layer with respect to the second prism surface, the second prism surface includes a plurality of second prism portions extending along the second direction, and the second prism portion has a reflection surface; the first prism sheet is configured to receive light incident by the light incident side surface and by the first prism portion, totally reflect light with an included angle not smaller than a first angle with the surface of the dielectric layer and reduce an included angle between the light and the first direction; and the second prism sheet is configured to enable light incident to the second prism portion through the second plane to be reflected towards the first direction by the reflection surface of the second prism portion and emerge from the first prism surface, wherein the second direction is parallel to the light incident side surface, and the first angle is a total reflection critical angle between the first prism sheet and the dielectric layer.

At least one embodiment of the present disclosure provides a light collimation assembly, including the above-mentioned light guide assembly and further including a collimation part. The collimation part is laminated with the light guide assembly along the first direction and is arranged on a side of the light guide assembly where the first prism sheet is arranged, wherein the collimation part is configured to receive light emerging from the first prism sheet of the light guide assembly, collimate a portion of the light, which is propagated along the second direction, towards the first direction and enable the collimated light to emerge.

At least one embodiment of the present disclosure provides a backlight module, including the above-mentioned light guide assembly or the above-mentioned light collimation assembly, and further including a light source which is arranged on a side of the first prism sheet, where the light incident side surface is positioned.

At least one embodiment of the present disclosure provides a display device, including the above-mentioned backlight module.

The light guide assembly, the light collimation assembly, the backlight module and the display device which are provided by the present disclosure will be illustrated by several specific embodiments.

Figure 2:
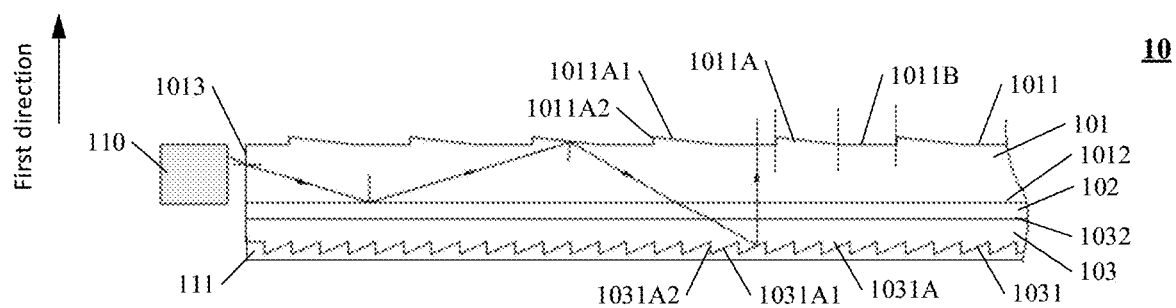
FIG. 2 is a cross-sectional schematic diagram of the light guide assembly in FIG. 1 along an A-A line.

At least one embodiment of the present disclosure provides a light guide assembly, FIG. 1 is a planar schematic diagram of the light guide assembly provided by this embodiment, and FIG. 2 is a cross-sectional schematic diagram of the light guide assembly in FIG. 1 along an A-A line. As shown in FIG. 1 and FIG. 2, the light guide assembly 10 includes a first prism sheet 101, a dielectric layer 102 and a second prism sheet 103 which are sequentially laminated along a first direction, and for example, the light guide assembly 10 includes a first prism sheet 101, a dielectric layer 102 and a second prism sheet 103 which are sequentially attached by taking the first direction as a normal direction; and a light refractive index of the dielectric layer 102 is smaller than that of the first prism sheet 101 and that of the second prism sheet 103.

The first prism sheet 101 includes a light incident side surface 1013 and a first plane 1012 and a first prism surface 1011 which are opposite to each other, the first plane 1012 is closer to the dielectric layer 102 with respect to the first prism surface 1011, i.e., the first plane 1012 and the dielectric layer 102 are adjacently arranged, the first prism surface 1011 includes a plurality of first prism portions 1011A extending along a second direction, the second direction is parallel to the light incident side surface. For example, the plurality of first prism portions 1011A are arranged in parallel side by side along a third direction, and the third direction is perpendicular to the second direction. In this embodiment, an extension direction (the second direction shown in the drawings) of the first prism portion 1011A refers to a direction perpendicular to a main cross-section of the first prism portion 1011A.

For example, a light source may be arranged on the light incident side surface 1013, so that light emitted by the light source can be incident into the first prism sheet 101 from the light incident side surface 1013. The first prism sheet 101 may reflect the light incident to the first prism surface 1011 at a certain angle to the dielectric layer 102 due to a total reflection effect, and enable light which is reflected by the second prism sheet 103 and meets a certain angle condition to emerge. For example, a total reflection critical angle between the first prism sheet 101 and the dielectric layer 102 is a first angle, the first prism sheet 101 may receive light incident by the light incident side surface 1013 and may totally reflect, by the first prism portion 1011A, light with an included angle not smaller than the first angle with the surface of the dielectric layer 102 and reduce an included angle between the totally reflected light and the first direction. (It will be illustrated in detail below)

The second prism sheet 103 includes a second plane 1032 and a second prism surface 1031 which are opposite to each other, the second plane 1032 is closer to the dielectric layer 102 with respect to the second prism surface 1031, i.e., the second plane 1032 and the dielectric layer 102 are adjacently arranged, the second prism surface 1031 includes a plurality of second prism portions 1031A extending along the second direction, and the second prism portion 1031A has a reflection surface; for example, the plurality of second prism portions 1031A are arranged in parallel side by side along the third direction. For example, the second prism sheet 103 is configured to enable light which is irradiated to the surface of the dielectric layer 102 at a second angle smaller than the first angle and incident to the second prism portion 1031A through the dielectric layer 102 to be reflected towards the first direction by the reflection surface of the second prism portion 1031A and emerge from the first prism surface 1011, so that the light emerging from the light guide assembly 10 is basically propagated along the first direction; for example, an included angle between an emergent direction of the light and the first direction is within a range of 0° to 10°, and further for example, within a range of 0° to 5°.

Figure 3:
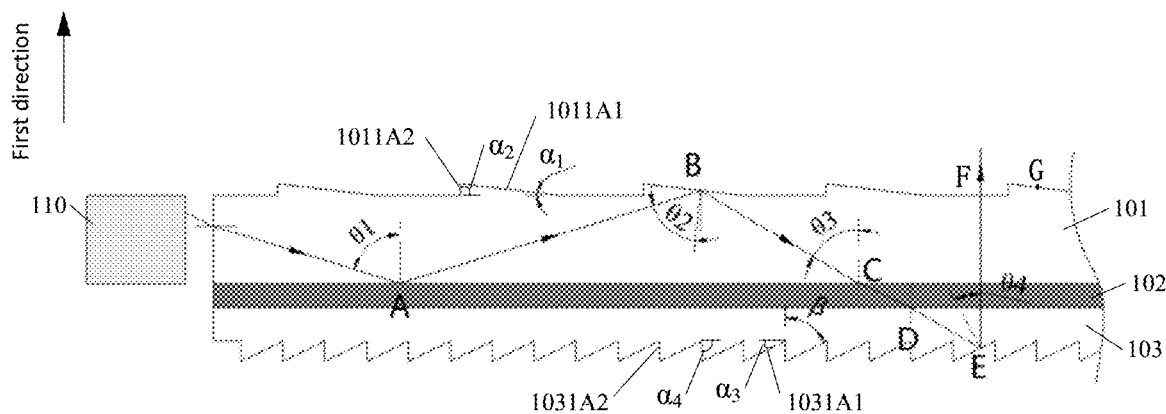
FIG. 3 is a schematic diagram of carrying out light collimation by a light guide assembly provided by an embodiment of the present disclosure.

For example, the first prism portion includes a first prism portion surface positioned on a side of the first prism sheet, which is away from the dielectric layer, e.g., a first sub prism surface 1011A1 in FIG. 3, a first included angle between a tangent plane at each point in the first prism portion surface and the first plane is γ1, where 0°<γ1≤10°, and a vertex of the first included angle is away from the light incident side surface, i.e., two edges of the first included angle are close to the light incident side surface, but the vertex of the first included angle is close to a side opposite to the light incident side surface with respect to the two edges.

For example, the first prism portion surface may be an inclined plane or a curved surface; or the first prism portion surface includes a plurality of sections of inclined plane portions, and two adjacent sections in the plurality of sections of inclined plane portions have different first included angles.

For example, the first included angle at each point in the curved surface meets the conditions above, the inclined plane has a consistent first included angle, and a tangent plane at each point in the inclined plane is just the inclined plane; or the first included angle of each section of the inclined plane meets the conditions above.

In this way, the first prism portion meeting the conditions above can enable the light totally reflected on the first plane to be still totally reflected after being incident to the first prism portion surface of the first prism portion, and can reduce the included angle between the totally reflected light and the first direction.

For example, the first prism portion further includes a second prism portion surface intersecting with the first prism portion surface, e.g., a first sub prism surface 1011A2 in FIG. 3, a second included angle between a tangent plane at each point in the second prism portion surface and the first plane is γ2, where 15°<γ2≤90°, and a vertex of the second included angle is close to the light incident side surface.

It should be noted that in this embodiment, by taking the total reflection critical angle between the first prism sheet 101 and the dielectric layer 102 as the first angle, i.e., as a reference value, the second angle is selected, and structural parameters of the second prism portion 1031A are configured on the basis of the second angle. For example, a range of a difference value Δ between the second angle smaller than the first angle and the first angle may be selected as 0<Δ≤2α, and the α may be an included angle α1 between the first sub prism surface 1011A1 and the first plane 1012. The second prism portion 1031A configured by utilizing the reference value can reflect the light towards the first direction, which is irradiated to a surface of the dielectric layer 102 at the second angle smaller than the first angle and incident to the second prism portion 1031A through the dielectric layer 102. For example, in this embodiment, under the modulation of the first prism sheet 101, the second angle is within a range slightly smaller than the first angle (which will be described in detail below). Therefore, the second angle can be basically equal to the total reflection critical angle, and for example, is determined within a range smaller than the total reflection critical angle by 0 to 5°. In view of the total reflection phenomenon, as long as a light incident angle is smaller than the critical angle, total reflection cannot occur; and thus, in one example, the second angle is selected to be smaller than and basically equal to the critical angle; at the moment, in order to facilitate calculation, the critical angle is selected to replace the second angle to carry out calculation, but it should be understood that in this example, the second angle is still smaller than the critical angle, or total reflection of the light will be generated.

For example, a main cross-section of the first prism portion 1011A along the first direction, i.e., a cross-section cut along a surface perpendicular to the light incident side surface, may be in a shape of polygon such as a triangle, or a deformed shape of the polygon such as a triangle, for example, an angle of the triangle is formed into an inverted rounded angle and the like, the main cross-section also may be of a shape of sector, curved sector and the like, the embodiments of the present disclosure do not make any limit thereto, as long as the light with the included angle not smaller than the first angle with the surface of the dielectric layer can be totally reflected and the included angle between the light and the first direction can be reduced.

When the second angle is selected, the second prism portion 1031A is configured to make the light which is irradiated to the surface of the dielectric layer 102 at the second angle and incident to the second prism portion 1031A through the dielectric layer 102 to be reflected towards the first direction by the second prism portion 1031A, i.e., the second angle is a reference value for designing a prism surface of the second prism portion 1031A. Even though the incident light is incident to the second prism portion 1031A at an incident angle slightly deviated from the second angle (for example, slightly greater than or slightly smaller than) through the dielectric layer 102, the light reflected by the second prism portion 1031A also may be slightly deviated from the first direction, but the second angle is only slightly smaller than the first angle, and thus, the deviation value is also relatively small, so that an effect of collimating the emergent light along the first direction is achieved.

For example, a main cross-section of the second prism portion 1031A along the first direction, i.e., a section cut along a surface perpendicular to the light incident side surface, can be in a shape of polygon such as a triangle or a deformed shape of the same, for example, an angle of the triangle is formed into an inverted rounded angle and the like, and the main section also can be in a shape of sector, curved sector and the like. The embodiments of the present disclosure do not make any limit thereto, as long as the light which is incident to the second prism portion through the second plane can be reflected towards the first direction by the reflection surface of the second prism portion and emerge from the first prism surface.

In this embodiment, the second direction and the third direction are in a plane where the first prism sheet is positioned, correspondingly, also may be in a plane where the second prism sheet is positioned, and thus are perpendicular to the first direction.

For example, as shown in FIG. 3, the first prism portion 1011A includes the first prism portion surface, e.g., the first sub prism surface 1011A1, the included angle between the first sub prism surface 1011A1 and the first plane 1012 is $\alpha_1$, and for example, a range of $\alpha_1$ is 0°<$\alpha_1$≤10°, e.g., 0°<$\alpha_1$≤3°, such as 1°, 2° or 3° and the like. For example, the included angle $\alpha_1$ faces the light incident side surface 1013 of the first prism sheet 101, i.e., the inside (a side facing the inside of the first prism portion 1011A) of the first sub prism surface 1011A1 faces the light incident side surface 1013 of the first prism sheet 101. Moreover, in this example, it is illustrated by taking a case that the second angle is smaller than and basically equal to the critical angle as an example.

For example, in this embodiment, the first prism portion 1011A further includes a second prism portion surface, e.g., a second sub prism surface 1011A2, the second sub prism surface 1011A2 intersects with the first sub prism surface 1011A1, and for example, the inside (a side facing the inside of the second sub prism surface 1011A2) of the second sub prism surface 1011A2 is arranged facing away from the light incident side surface 1013 of the first prism sheet 101. For example, an included angle between a plane where the second sub prism surface 1011A2 is located and the first plane 1012 is $\alpha_2$, for example, a range of $\alpha_2$ is 15°≤$\alpha_2$≤90°, e.g., 45°≤$\alpha_2$≤90°, and for example, $\alpha_2$ is 30°, 45°, 55°, 65°, 75°, 80°, 85° or 90° and the like.

For example, in this embodiment, the dielectric layer 102 is sandwiched between the first prism sheet 101 and the second prism sheet 102, and may be made of an inorganic or organic transparent material. In one example, a material of the dielectric layer 102 includes an Optical Clear Adhesive (OCA) which may be used for adhering the first prism 101 and the second prism sheet 102 together. A refractive index of the OCA is smaller than that of the first prism sheet 101 and that of the second prism sheet 102. For example, the refractive index of the OCA is about 1.2 to 1.4, e.g., 1.3 or 1.4 and the like.

For example, in this embodiment, the first prism sheet 101 and the second prism sheet 102 are the same in refractive index so as to facilitate angle design on the prism portions of the first prism sheet 101 and the second prism sheet 102. For example, the first prism sheet 101 and the second prism sheet 102 are prepared from the same material, and thus have the same refractive index, and the material may be a material such as glass or resin and the like, with a refractive index of about 1.5 to 1.8, e.g., 1.6, 1.7 or 1.8 and the like.

For example, the second prism portion 1031A includes a third prism portion surface, a third included angle between a tangent plane at each point in the third prism portion surface and the first plane is γ3, where 0°<γ3≤10°, a vertex of the third included angle is away from the light incident side surface, and γ3 meets a formula (1): γ3=$\alpha_3$.

For example, in this embodiment, the second prism portion 1031A includes the third prism portion surface, e.g., a third sub prism surface 1031A1, at least the third sub prism surface 1031A1 is configured as a reflection surface, and for example, it can be implemented by plating a reflection layer (e.g., a metal aluminum thin layer) on the third sub prism surface 1031A1. For example, an included angle between a plane where the third sub prism surface 1031A1 is positioned and the second plane 1032 is α3 and faces the light incident side surface 1013 of the first prism surface 101, and at the moment, the inside (a side facing the inside of the second prism portion 1031A) of the third sub prism surface 1031A1 faces the light incident side surface 1013 of the first prism sheet 101. For example, the included angle $\alpha_3$ between the plane where the third sub prism surface 1031A1 is positioned and the second plane 1032 may be calculated by a formula 1 below:

$$\alpha 3 = \frac{1}{2}\arcsin\left[\frac{n1}{n3} \times \sin\left(\arcsin\left(\frac{n2}{n1}\right) - \alpha 1\right)\right] \quad (1)$$

Where, n1 represents the refractive index of the first prism sheet, n2 represents the refractive index of the dielectric layer, and n3 represents the refractive index of the second prism sheet.

The included angle $\alpha_3$ obtained by such formula can enable the light which is irradiated to the surface of the dielectric layer 102 at the second angle and incident to the second prism portion 1031A through the dielectric layer 102 to be reflected towards the first direction by the second prism portion 1031A, i.e., reflected vertically upward in the drawing.

For example, the second prism portion 1031A includes a fourth prism portion surface, a fourth included angle between a tangent plane at each point in the fourth prism portion surface and the first plane is γ4, where 30°≤γ4≤90°, the vertex of the fourth included angle is close to the light incident side surface, γ4=α4, and γ4 meets descriptions about $\alpha_4$ below.

For example, in this embodiment, the second prism portion 1031A further includes the fourth sub prism surface 1031A2, and the fourth sub prism surface 1031A2 intersects with the third sub prism surface 1031A1. For example, the inside (a side facing the inside of the second prism portion 1031A) of the fourth sub prism surface 1031A2 faces a side away from the light incident side surface 1013 of the first prism sheet 101, an included angle between a plane where the fourth sub prism surface 1031A2 is positioned and the second plane 1032 is $\alpha_4$, for example, a range of $\alpha_4$ is 30°≤$\alpha_4$≤90°, e.g., 60°≤$\alpha_4$≤90°, and for example, $\alpha_4$ is 40°, 50°, 60°, 70°, 80°, 85° or 90° and the like.

For example, in one example of this embodiment, a cross-main section of the second prism portion 1031A is in a shape of a right triangle, and a plane where a bevel edge of the right triangle is positioned is configured as the third sub prism surface 1031A1. For example, the third sub prism surface 1031A1 is mainly used for collimating the light towards the first direction.

For example, in one example, $\alpha_1$ is set as 2°, $\alpha_2$ is set as 45°, $\alpha_3$ is set as 27.5°, and $\alpha_4$ is set as 70°. The setting not only can achieve a good collimation effect, but also is convenient for production of each portion of the light guide assembly.

For example, in this embodiment, as shown in FIG. 2, the surface of the second prism portion 1031A further may have a protection layer 111 so as to prevent abrasion to the second prism portion 1031A. For example, a material of the protection layer 111 is a resin material.

For example, FIG. 3 further shows a schematic diagram of carrying out light collimation by the light guide assembly provided by this embodiment. As shown in FIG. 3, in this example, the refractive indexes of the first prism sheet 101 and the second prism sheet 103 are set to be the same, and the total reflection critical angle between the first prism sheet 101 and the dielectric layer 102 and the total reflection critical angle between the second prism sheet 103 and the dielectric layer 102 are θ (the first angle). The light incident side surface 1013 of the first prism sheet 101 is provided with the light source 110, the light source 110, for example, is a light-emitting structure such as a Light-Emitting Diode (LED) and the like, and the light-emitting structure, for example, is linearly arranged along the light incident side surface 1013. For example, the light source 110 includes the LED and a reflection shell arranged around the LED so as to form a Lambert body light source, and may relatively uniformly emit light into the first prism sheet 101 at a preset angle (or in an angle range) through the light incident side surface 1013 of the first prism sheet 101 and enable the incident light to be totally reflected in the first prism sheet 101, so that the light can be propagated from the light incident side surface to the other side opposite to the light incident side surface.

In the above-mentioned case, when a light beam (shown as arrows in the drawings) emitted by the light source 110 enters the first prism sheet 101 from the light incident side surface of the first prism sheet 101 and for example, is incident to a point A at an interface of the first prism sheet 101 and the dielectric layer 102, if an included angle θ1 between the light and the first direction, i.e., a vertical direction in the drawings, is smaller than θ, i.e., θ1<θ, the light can enter the second prism sheet 103 via the dielectric layer 102 and is reflected towards the first direction or a direction facing the first direction by the second prism sheet 103, and the light, for example, is modulated into collimated light basically propagated along the first direction by the third sub prism surface 1031A1 (with reference to a collimation path of a point E).

In another aspect, if the included angle θ1 between the light and the first direction is greater than θ, i.e., θ1>θ (the case shown in FIG. 3), the light is totally reflected at the point A and returned to the first prism surface 1011 of the first prism sheet 101, e.g., a point B on the first prism portion 1011A, the first prism portion 1011A of the first prism sheet 101 can reduce the included angle between the light and the first direction when reflecting the light, at the moment, after the light is totally reflected at the point B, the included angle between the light and the first direction is reduced to θ3, and θ3=θ1−2α₁, i.e., a value by which the first prism portion 1011A reduces the included angle between the light and the first direction is related to the included angle α₁ between the first sub prism surface 1011A1 facing the light incident side surface 1013 of the first prism sheet 101 and the first plane 1012, and for example, the included angle is reduced by 2α₁ each time. When the angle θ3 is reduced to be smaller than θ, i.e., θ3<θ, the light can enter the dielectric layer 102 from a point C and enter the second prism sheet 103 from a point D, and is finally modulated into the collimated light propagated along the first direction by the point E of the third sub prism surface 1031A1; and if the angle θ3 is still greater than θ after the light is reflected by the first prism sheet 101, the light may be continuously totally reflected in the first prism sheet 101, the included angle with the first direction is reduced again under the reflection action of the first prism portion 1011A of the first prism sheet 101, and finally, when θ3 is reduced to be smaller than θ, the light can enter the second prism sheet 103 and be modulated into the collimated light propagated along the first direction.

In another example of this embodiment, the second angle is selected to be smaller than the critical angle (i.e., the first angle) by α1, and then on the basis of a condition that the light which is irradiated to the surface of the dielectric layer at the second angle and incident to the second prism portion through the dielectric layer is reflected towards the first direction by the second prism portion, the included angle α₃ between the third sub prism surface 1031A1 and the second plane 1032 is calculated. In this example, the first prism sheet 101 and the second prism sheet 102 are the same in refractive index, and the second angle is smaller than the critical angle (i.e., the first angle) by α1, and thus, it may be obtained according to the formula 1 that:

$$\alpha 3 = \frac{1}{2}(\arcsin(n2/n1) - \alpha 1)$$

Still with reference to FIG. 3, when the light beam (shown as the arrows in the drawing) emitted by the light source 110 enters the first prism sheet 101 from the light incident side surface of the first prism sheet 101 and for example, is incident to the point A at the interface of the first prism sheet 101 and the dielectric layer 102, if the included angle θ1 between the light and the first direction, i.e., the vertical direction in the drawing, is smaller than θ, i.e., θ1<θ, the light can enter the second prism sheet 103 via the dielectric layer 102 and is reflected towards the first direction or a direction facing the first direction by the second prism sheet 103, and the light, for example, is modulated into the collimated light basically propagated along the first direction by the third sub prism surface 1031A1 (with reference to the collimation path of the point E).

In another aspect, if the included angle θ1 between the light and the first direction is greater than θ, i.e., θ1>θ (the case shown in FIG. 3), the light is totally reflected at the point A and returned to the first prism surface 1011 of the first prism sheet 101, e.g., the point B on the first prism portion 1011A, the first prism portion 1011A of the first prism sheet 101 can reduce the included angle between the light and the first direction when reflecting the light, at the moment, after the light is totally reflected at the point B, the included angle between the light and the first direction is reduced into θ3, and θ3=θ1−2α₁, i.e., the value by which the first prism portion 1011A reduces the included angle between the light and the first direction is related to the included angle α₁ between the first sub prism surface 1011A1 facing the light incident side surface 1013 of the first prism sheet 101 and the first plane 1012, and for example, the included angle is reduced by 2α₁ each time. When the angle θ3 is reduced to be smaller than θ, the light can enter the dielectric layer 102 from the point C and enter the second prism sheet 103 from the point D, and is finally modulated into the collimated light propagated along the first direction by the point E of the third sub prism surface 1031A1; and if the angle θ3 is still greater than θ after the light is reflected by the first prism sheet 101, the light may be continuously totally reflected in the first prism sheet 101, the included angle with the first direction is reduced again under the reflection action of the first prism portion 1011A of the first prism sheet 101, and finally, when θ3 is reduced to be smaller than θ, the light can enter the second prism sheet 103 and be modulated into the collimated light propagated along the first direction. In this example, the second angle is selected to be smaller than the first angle (i.e., θ) by α₁, and thus, the angle θ3 is gradually reduced by a step length of 2α₁ to be smaller than the first angle θ, the light can enter the second prism sheet 103 via the dielectric layer 102, and the included angle between the light reflected at the point E of the third sub prism surface 1031A1 of the second prism portion and the first direction is smaller than α₁, which is helpful for improving the collimation degree of the obtained collimated light.

For example, in this embodiment, as shown in FIG. 2, the first prism surface 1011 further may include a plurality of first plane portions 1011B, and the plurality of first plane portions 1011B are respectively positioned between the adjacent first prism portions 1011A. In this embodiment, the plurality of first prism portions 1011A in the first prism surface 1011 are spaced with the first plane portions 1011B, i.e., the plurality of first prism portions 1011A in this embodiment adopt a discontinuous arrangement mode, and the first plane portions 1011B cannot regulate an angle of the light incident to the first prism sheet 101, and thus, the light can be continuously totally reflected in the first prism sheet 101, the included angle with the first direction is reduced again under the reflection action of the first prism portion 1011A of the first prism sheet 101 until after the light is modulated by the first prism portion 1011A, the angle between the light and the first direction is reduced to be smaller than θ, and at the moment, the light can be incident to the second prism sheet 103 and emerge after being collimated by the second prism sheet 103. Therefore, in this embodiment, uniformity of carrying out collimation on the light can be regulated by setting widths and spacing of the first prism portions 1011A arranged at different positions or widths and spacing of the first plane portions 1011B and the like.

For example, in this embodiment, when the first prism portion 1011A is of a strip shape, at least two first prism portions 1011A are different in width in the third direction; or, at least two first plane portions 1011B are different in width in the third direction; or, at least two first prism portions 1011A are different in width in the third direction, at least two first plane portions 1011B are also different in width in the third direction.

Figure 4A:
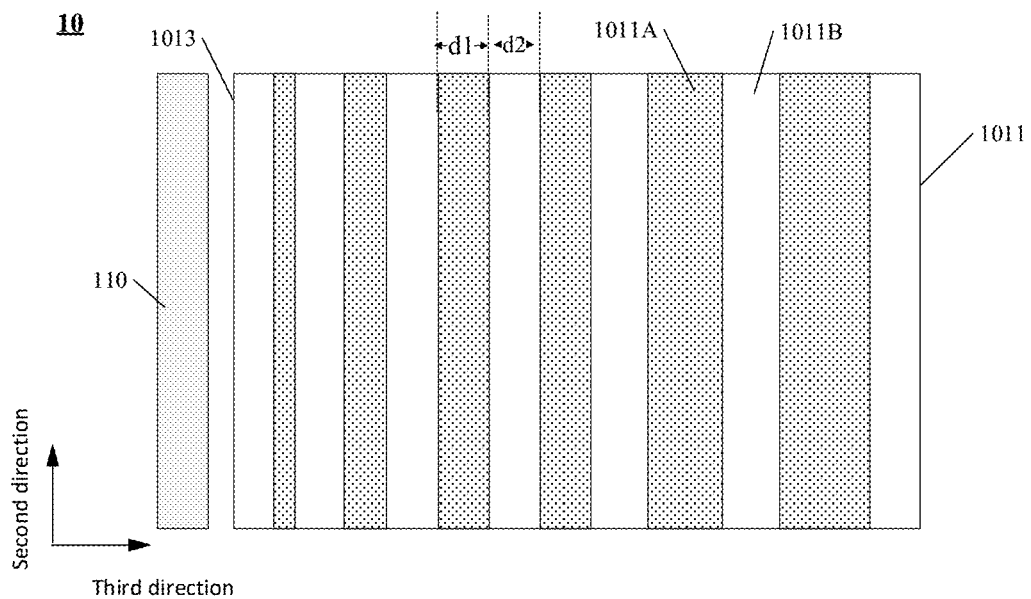
FIGS. 4A to 4C are schematic diagrams of arrangement of a first prism portion and a first plane portion in a light guide assembly provided by an embodiment of the present disclosure.
Figure 4B:
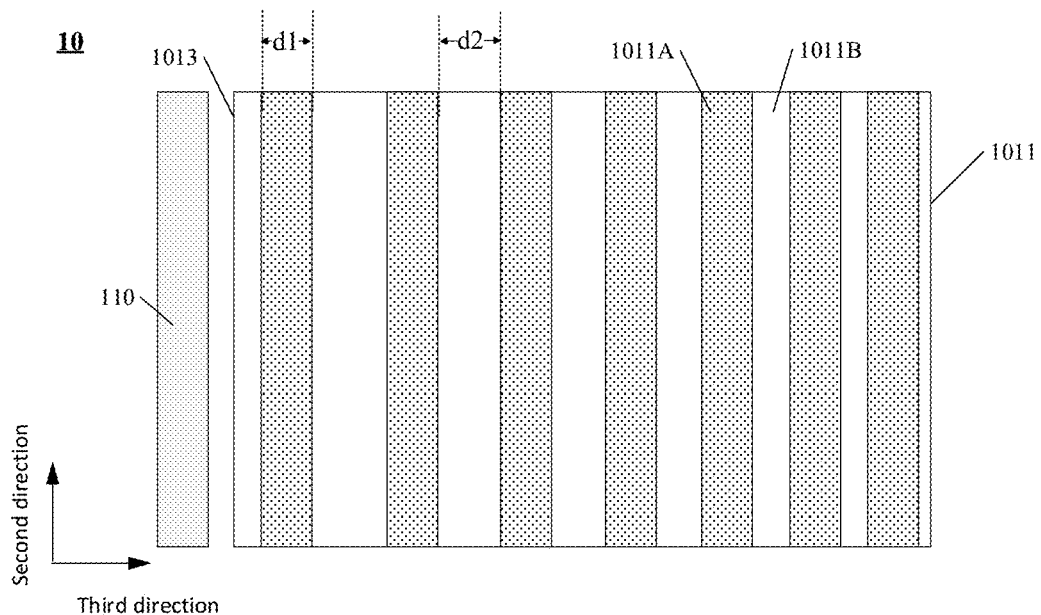
Figure 4C:
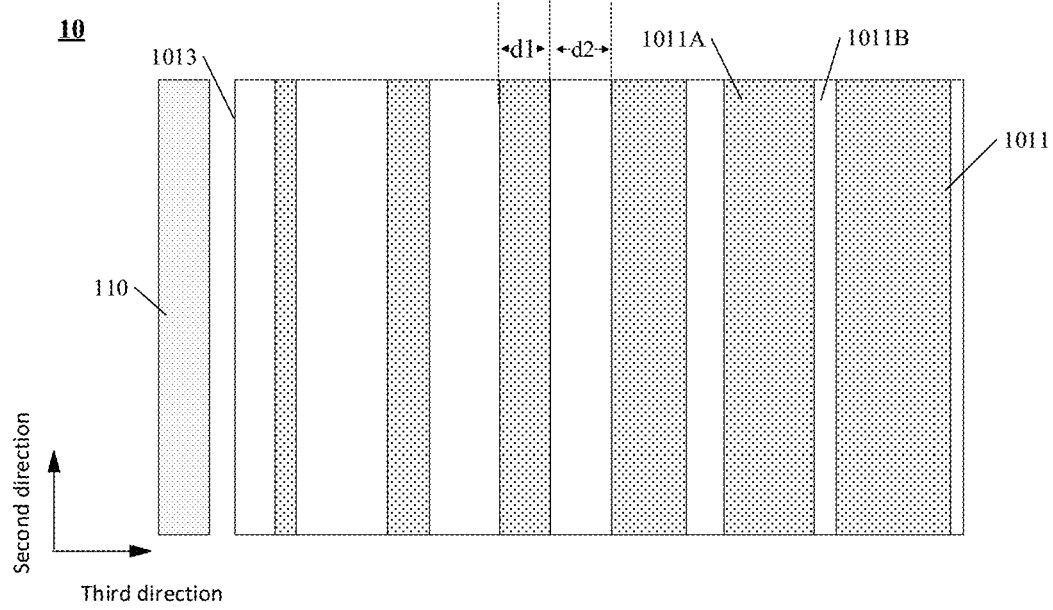

For example, the light source 110 is arranged at the position of the light incident side surface 1013 of the first prism sheet 101, at the moment, for example, as shown in FIG. 4A, the first prism portion 1011A closer to the light incident side surface 1013 has a smaller width d1, and the widths d2 of the first plane portions 1011B are all the same; or, as shown in FIG. 4B, the first plane portion 1011B closer to the light incident side surface 1013 has a greater width d2, and the widths d1 of the first prism portions 1011A are all the same; or, as shown in FIG. 4C, when the first prism portion 1011A closer to the light incident side surface 1013 has a smaller width d1, the first plane portion 1011B closer to the light incident side surface 1013 has a greater width d2.

In this embodiment, the light is more sufficient at a position closer to the light source 110 and the light is more sparse at a position further away from the light source 110, and thus, by disposing the first prism portions 1011A arranged more sparsely at positions closer to the light source 110 and disposing the first prism portions 1011A arranged more densely at positions further away from the light source 110, the first prism portions 1011A can reflect less light at the positions closer to the light source 110 and reflect more light at positions further away from the light source 110, so that the second prism sheet collimates more light at the positions closer to the light source 110 and collimates less light at the positions further away from the light source 110. Therefore, uniformity of the emergent light at different positions of the light guide assembly can be regulated, so as to improve brightness uniformity of the light guide assembly.

For example, values of the widths of the first prism portions 1011A and the first plane portions 1011B and the like may be optimized by applying optimal simulation software (e.g., Lighttools or the like), for example, the widths and the spacing of the first prism portions 1011A and/or the first plane portions 1011B are taken as variables, a target function of brightness uniformity is set, and optimized parameters of the values of the widths of the first prism portions 1011A and the first plane portions 1011B and the like are obtained by calculation, e.g., parameters are subjected to iterative optimization in the Lighttools by adopting a Backlight Pattern Optimization (BPO) module and finally, the optimized parameters are obtained, and under the parameter setting, emergent brightness of the light guide assembly is more uniform.

In this embodiment, in the case that the first prism portions 1011A are spaced with the first plane portions 1011B, as shown in FIG. 3, the light emerging from the light guide assembly may emerge from the first prism portions 1011A and for example, emerge from a point G, and also may emerge from the first plane portions 1011B and for example, emerge from a point F. When the light emerges from the first plane portion 1011B, the emergent light is basically perpendicular to the first plane portion 1011B, and thus, the first plane portion 1011B basically cannot change a propagation direction of the emergent light; and moreover, when the light emerges from the first prism portion 1011A, the included angle $\alpha_1$ between the first prism portion 1011A and the first plane 1012 is relatively small and for example, $0° < \alpha_1 \leq 3°$, and thus, the angle of the light emerging from the first prism portion 1011A is also changed a little, the changed angle is set as γ, and then:

$$\gamma = \arcsin(n1 \times \sin \alpha_1) - \alpha_1$$

Where, n1 represents the refractive indexes of the first prism sheet 101 and the second prism sheet 103, and $\alpha_1$ represents the included angle between the first prism portion 1011A and the first plane 1012. The angle γ is relatively small, and thus, the emergent light also may be considered to be propagated basically along the first direction.

Figure 5A:
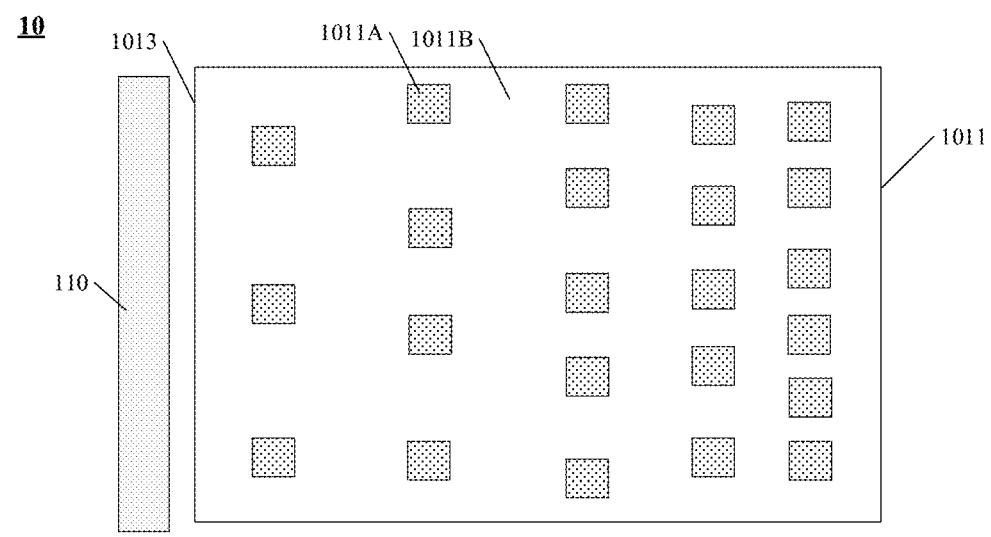
FIG. 5A is a schematic diagram of arrangement of a first prism portion in a light guide assembly provided by an embodiment of the present disclosure.

For example, in this embodiment, as shown in FIG. 5A, the first prism portion 1011A also may be of a block shape, and a set density of the first prism portion 1011A is increased along a direction (i.e., a horizontal direction from left to right in the drawing) away from the light incident side surface 1013. For example, portions on the first prism surface 1101 except for the first prism portions 1011A are all the first plane portions 1011B. In this embodiment, an arrangement mode of the first prism portions 1011A may be a regular array arrangement mode and also may be an irregular arrangement mode, and the embodiment does not make any limit thereto.

Figure 5B:
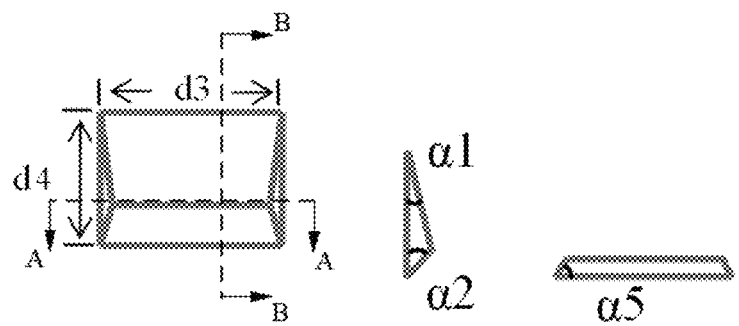
FIG. 5B is a schematic diagram of a first prism portion in a light guide assembly provided by an embodiment of the present disclosure.

For example, FIG. 5B shows a schematic diagram of the block-shaped first prism portion 1011A in one example. For example, FIG. 5B sequentially includes a top view of the first prism portion 1011A and a cross-section view of the top view along a B-B line and an A-A line from left to right. In this example, for example, lengths d3 and d4 of both two main edges of the first prism portion 1011A are 45 μm, a cross-section along the B-B line is a main cross-section of the first prism portion 1011A, the included angle $\alpha_1$, i.e., the included angle between the first sub prism surface of the first prism portion 1011A and the first plane, is 2°, and the included angle $\alpha_2$, i.e., the included angle between the second sub prism surface and the first plane, is 45°. In the cross-section of the first prism portion 1011A along A-A, an included angle $\alpha_5$ is 45°. In other examples of this embodiment, each parameter of the block-shaped first prism portion 1011A may be selected as required, and the embodiment does not make any limit thereto.

In this embodiment, a plurality of second prism portions 1031A, for example, may be continuously arranged on the second prism surface 1031, i.e., side surfaces of each two adjacent second prism portions intersect with each other, so that more light can be calibrated and a utilization rate of the light is improved.

The light guide assembly provided by the embodiment of the present disclosure can change the light into the emergent light collimated basically along the first direction in the third direction, and emergent uniformity of the light guide assembly can be regulated by optimization on the parameters of the prism portion, so that brightness of the light emerging by the light guide assembly is higher and more uniform.

Figure 6:
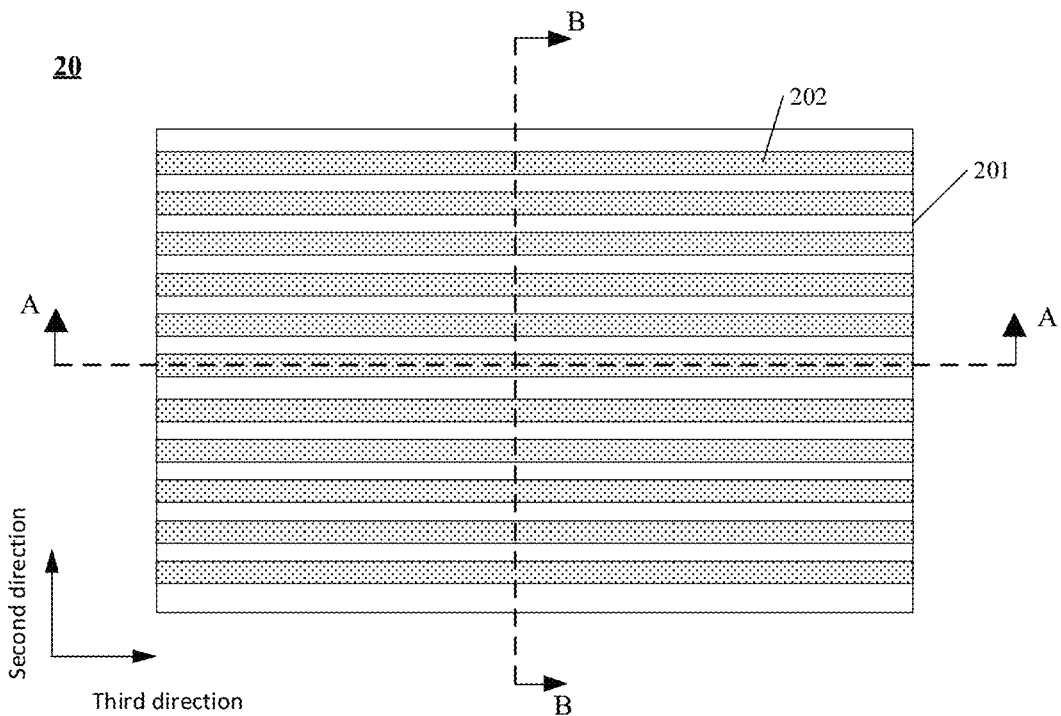
FIG. 6 is a planar schematic diagram of a light collimation assembly provided by an embodiment of the present disclosure.
Figure 7A:
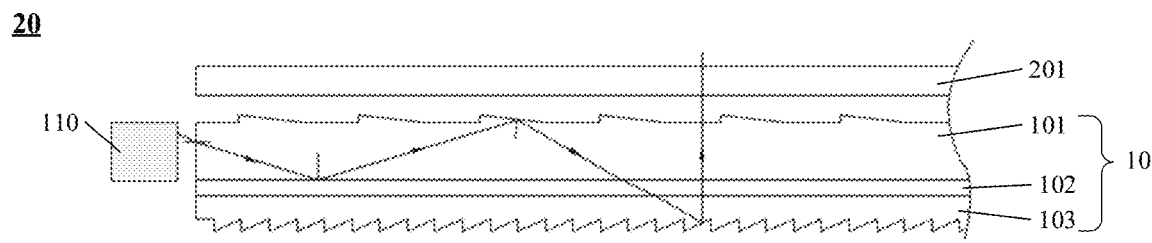
FIG. 7A is a cross-sectional schematic diagram of the light collimation assembly in FIG. 6 along an A-A line.

At least one embodiment of the present disclosure provides a light collimation assembly; FIG. 6 is a planar schematic diagram of the light collimation assembly provided by this embodiment; FIG. 7A is a cross-sectional schematic diagram of the light collimation assembly in FIG. 6 along an A-A line; and FIG. 7B is a cross-sectional schematic diagram of the light collimation assembly in FIG. 6 along a B-B line.

Figure 7B:
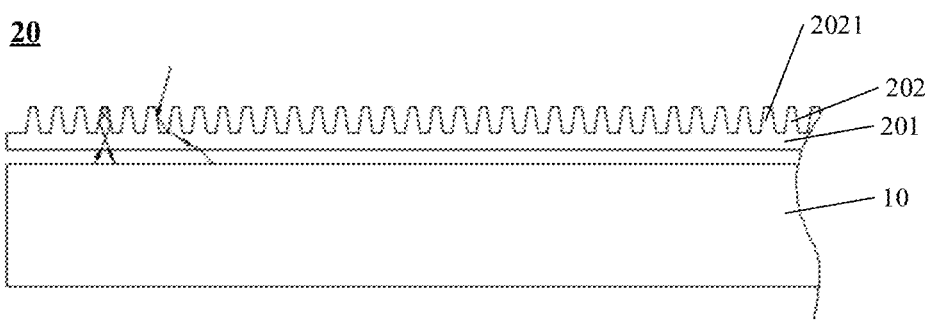
FIG. 7B is a cross-sectional schematic diagram of the light collimation assembly in FIG. 6 along a B-B line.

As shown in FIG. 6 to FIG. 7B, the light collimation assembly 20 includes any one light guide assembly 10 above and a collimation part 201, and the collimation part 201 is laminated with the light guide assembly 10 along the first direction and is arranged on a side of the light guide assembly 10 where the first prism sheet is arranged; the light guide assembly 10 can collimate a portion of light, which is propagated in the third direction, along the first direction and enable the collimated light to emerge; and the collimation part 201 is configured to receive the light emerging from the first prism sheet of the light guide assembly 10, collimate a portion of the light, which is propagated along the second direction, towards the first direction and enable the collimated light to emerge.

For example, in this embodiment, the collimation part 201 includes a grating layer 202, and the grating layer 202 includes a grating strip 2021 extending the third direction. The grating strip 2021 can take a modulation effect on the light.

For example, in this embodiment, the grating layer 202 may be arranged on a side of the collimation part 201, which is close to the light guide assembly, or a side of the collimation part 201, which is away from the light guide assembly. For example, FIG. 7B shows a case that the grating layer 202 is arranged on a side of the collimation part 201, which is away from the light guide assembly, and when the grating layer 202 is arranged on a side of the collimation part 201, which is close to the light guide assembly, an arrangement mode as shown in FIG. 8A is adopted.

For example, a cross section of the grating strip 2021 along the second direction is of a trapezoid shape, and a side surface of the grating strip 2021 has a reflection layer. As shown in FIG. 7B, the grating layer 202 is arranged on a side of the collimation part 201, which is away from the light guide assembly, the side surface of the grating strip 2021 has the reflection layer (e.g., a plated metal aluminum thin layer), and the top and the bottom of the grating strip 2021 are light transmission layers. When light is irradiated into an inner surface of the grating strip 2021 (e.g., light on a left side in the drawing), the light can be repeatedly reflected by the reflection layer of the grating strip 2021 and finally irradiated into the light guide assembly 10, and after being modulated by the light guide assembly 10, the light is returned to the collimation part 201. When light is irradiated into an outer surface of the grating strip 2021 (e.g., light on a right side in the drawing), the light is reflected by the grating strip 2021 with the trapezoid cross-section, and the reflection can collimate the light towards the first direction and for example, reduce an angle between the light and the first direction, and thus, the collimation degree of the light along the first direction can be improved.

Figure 8A:
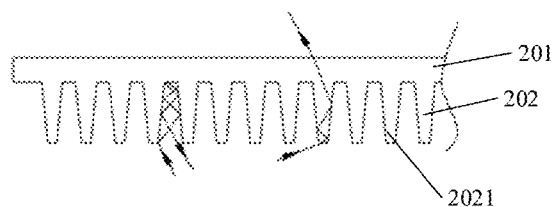
FIG. 8A and FIG. 8B are schematic diagrams of two types of grating strips provided by an embodiment of the present disclosure.

For example, when the grating layer 202 is arranged on a side of the collimation part 201, which is away from the light guide assembly, i.e., the grating layer 202 in FIG. 7B is replaced with a grating layer 202 in FIG. 8A, the side surface of the grating strip 2021 has a reflection layer, and the top and the bottom of the grating strip 2021 are light transmission layers. At the moment, when light is irradiated into the outer surface of the grating strip 2021 (e.g., light on a left side in the drawing), the light can be repeatedly reflected on the side surface of the grating strip 2021, then irradiated into the light guide assembly 10, and returned to the collimation part 201 after being modulated by the light guide assembly 10. When light is irradiated into the inner surface of the grating strip 2021 (e.g., light on the right side in the drawing), the light is reflected by the grating strip 2021 with the trapezoid cross-section, and the reflection can collimate the light towards the first direction and for example, reduce an angle between the light and the first direction, and thus, the collimation degree of the light along the first direction can be improved.

For example, in this embodiment, a cross section of the grating strip 2021 along the second direction also may be of a rectangle shape, and a material of the grating strip 2021 is a light absorption material.

Figure 8B:
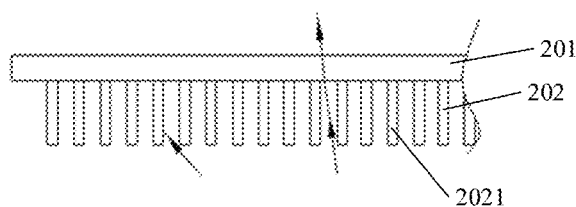

For example, when the grating layer 202 in FIG. 7B is replaced with a grating layer 202 in FIG. 8B, in this example, the grating strip 2021 with the rectangular cross-section has light absorption property, and thus, light (e.g., light on the left side in the drawing) irradiated into the surface of the grating strip 2021 can be absorbed by the grating strip 2021 without emerging; and light (e.g., light on the right side in the drawing) which is not irradiated into the grating strip 2021 can transmit the collimation part 201 to emerge, and thus, the light with a small included angle with the first direction may emerge, so that the collimated light along the first direction may be obtained. In this embodiment, a part of light is absorbed by the grating strip 2021, and thus, light emerging by the collimation part 201 may be relatively low in brightness, and at the moment, increment may be carried out by increasing the prism sheets and other modes. When the cross-section of the grating strip 2021 is of a rectangle shape, no matter whether the grating layer 202 is arranged on a side of the collimation part 201, which is away from the light guide assembly, or the grating layer 202 is arranged on a side of the collimation part 201, which is close to the light guide assembly, the collimation principles of the grating strips 2021 are the same and thus are not respectively described.

In a light collimation assembly provided by one embodiment of the present disclosure, the included angle $\alpha_1$ between the first sub prism surface 1011A1 of the first prism sheet 101 of the light guide assembly and the first plane 1012 is 0.5°, and the included angle $\alpha_2$ between the second sub prism surface 1011A2 and the first plane 1012 is 90°; the included angle $\alpha_3$ between the third sub prism surface 1031A1 of the second prism sheet and the second plane 1032 is 57.5°, and the included angle $\alpha_4$ between the fourth sub prism surface 1031A2 of the second prism sheet and the second plane 1032 is 90°; and the cross section of the collimation part 201 including the grating strip 2021 is of a trapezoid shape, a height of the trapezoid grating strip 2021 is 0.03 mm, a width of the trapezoid grating strip 2021 is 0.01 mm, a distance between the trapezoid grating strips 2021 is 0.02 mm, a base angle of the trapezoid grating strip

Figure 9A:
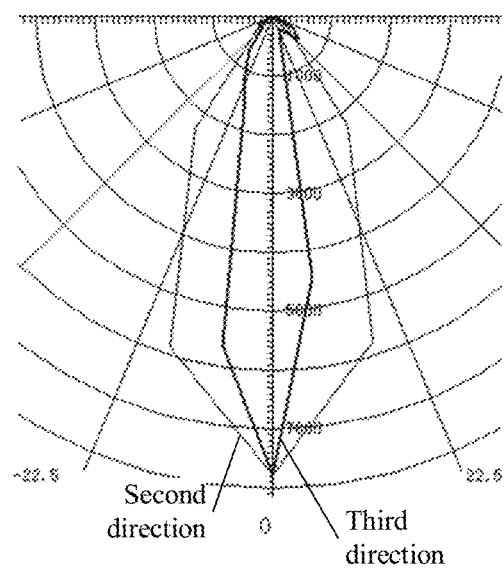
FIG. 9A and FIG. 9B are test charts of light collimation effects of two types of light collimation assembly provided by an embodiment of the present disclosure.

2021 is 80°, and the side surface of the grating strip 2021 has the reflection layer. Under the above-mentioned parameters and after testing, as shown in FIG. 9A, in the third direction, a half-brightness angle of the emergent light collimated along the first direction after being modulated by the light collimation assembly is about ±10°, in the second direction, a half-brightness angle of the emergent light collimated along the first direction after being modulated by the light collimation assembly is about ±23°, the emergent light has a cut-off angle, and for example, the cut-off angles in the second direction and in the third direction are within a range of about ±50°. The half-brightness angle refers to an angle when light brightness is half of the highest brightness and may be used for evaluating the collimation degree of the light, and the smaller the half-brightness angle is, the higher the collimation degree of the light is. The cut-off angle refers to an angle when the light brightness is basically 0 or the light brightness is smaller than 5% of the highest brightness.

Figure 9B:
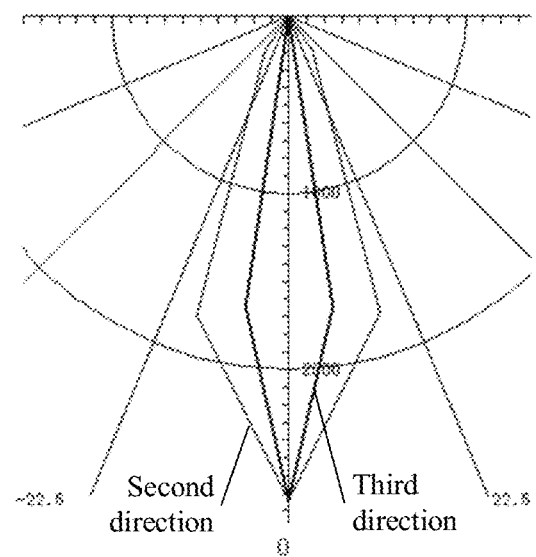

In a light collimation assembly provided by another embodiment of the present disclosure, parameters of the light guide assembly are the same with the above; i.e., the included angle cu between the first sub prism surface 1011A1 of the first prism sheet 101 of the light guide assembly and the first plane 1012 is 0.5°, and the included angle $\alpha_2$ between the second sub prism surface 1011A2 and the first plane 1012 is 90°; the included angle $\alpha_3$ between the third sub prism surface 1031A1 of the second prism sheet and the second plane 1032 is 57.5°, and the included angle $\alpha_4$ between the fourth sub prism surface 1031A2 of the second prism sheet and the second plane 1032 is 90°; and different from the above, the cross section of the collimation part 201 including the grating strip 2021 is of a rectangle shape, at the moment, a height of the rectangular grating strip 2021 is 0.03 mm, a width of the rectangular grating strip 2021 is 0.01 mm, a distance between the rectangular grating strips 2021 is 0.02 mm, and the grating strip 2021 includes a light absorption material. Under the above-mentioned parameters and after testing, as shown in FIG. 9B, in the third direction, a half-brightness angle of the emergent light collimated along the first direction after being modulated by the light collimation assembly is about ±9°, in the second direction, the half-brightness angle of the emergent light collimated along the first direction after being modulated by the light collimation assembly is about ±19°, the emergent light has a cut-off angle, and for example, the cut-off angles in the second direction and in the third direction are within a range of about ±40°.

It can be seen that the light collimation assembly provided by the embodiments of the present disclosure can simultaneously implement collimation on the light in the second direction and the third direction, i.e., can implement two-dimensional collimation on the light. In addition, by optimization on the parameters of each part in the light collimation assembly, when the light emerging from the light collimation assembly is collimated along the first direction, the brightness of the emergent light can be higher and more uniform.

In another aspect, conventional design generally adopts a plurality of reflection sheets to regulate the propagation path of the light, and thus, arrangement of the reflection sheets is complex and needs to be designed by a precise light path design, but the light collimation assembly provided by the embodiments of the present disclosure reduces use of the reflection sheets in the conventional design by design on a prism microstructure, so that the structure of the light collimation assembly is simpler.

Figure 10:
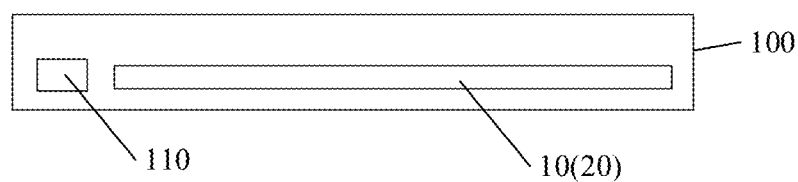
FIG. 10 is a schematic diagram of a backlight module provided by an embodiment of the present disclosure.

At least one embodiment of the present disclosure provides a backlight module, and as shown in FIG. 10, the backlight module 100 includes any one light guide assembly 10 above or any one light collimation assembly 20 above.

For example, the backlight module provided by this embodiment further may include a light source 110, and the light source 110 is arranged on the light incident side surface 1013 of the first prism sheet 101 in the light guide assembly 10. The light source 110, for example, includes a plurality of light-emitting structures such as LEDs and the like, which are arranged side by side, and the light-emitting structures, for example, are linearly arranged along the light incident side surface 1013. The light source also may be a linear light source such as a Cold Cathode Fluorescent Lamp (CCFL) and the like.

For example, when the first prism portion 1011A structurally is of a strip shape, the first prism portion 1011A closer to the light source 110 has a smaller width; or, the first plane portion 1011B closer to the light source 110 has a greater width; or, when the first prism portion 1011A closer to the light source 110 has a smaller width, the first plane portion 1011B closer to the light source 110 has a greater width. The design can regulate uniformity of the emergent light at different positions of the light guide assembly, so that the brightness uniformity of the backlight module can be improved.

Emergent light of the backlight module provided by the embodiments of the present disclosure is collimated light, and the backlight module is high in utilization rate for the light source 110, and thus, energy consumption can be reduced.

Figure 11:
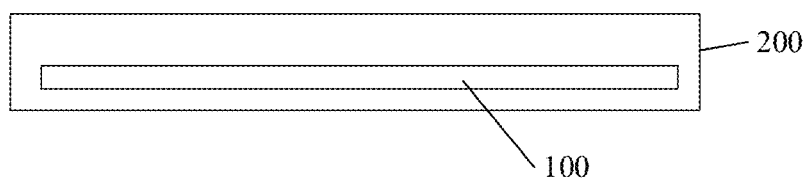
FIG. 11 is a schematic diagram of a display device provided by an embodiment of the present disclosure.

At least one embodiment of the present disclosure provides a display device, and as shown in FIG. 11, the display device 200 includes any one backlight module 100 above. The display device 200 may be any product or part with a display function, such as a mobile phone, a tablet personal computer, a television, a display, a notebook computer, a digital photo frame, a navigator and the like. In this embodiment, the display device is relatively low in display energy consumption and uniform in light emergence.

For example, emergent light of the display device 200 has the collimation property, and thus, the display device 200 can implement intelligent display, for example, has the characteristics of preventing peep, displaying a High Dynamic Range (HDR) image and the like so as to meet functional demands of different types of display device, and for example, may be applied to a display device for Virtual Reality (VR) display, vehicle-mounted display, 3D display and the like, which have specific use distances and specific inclination angles.

The following points should be noted:

(1) The accompanying drawings in the embodiments of the present invention only involve structures relevant to the embodiments of the present invention, and other structures may refer to the prior art.

(2) For clarity, in the accompanying drawings of the embodiments of the present invention, the thickness and the size of layers or microstructures are enlarged. It should be understood that: when an element such as a layer, a film, a region or a substrate is referred to as being disposed "on" or "beneath" another element, the element may be "directly" disposed "on" or "beneath" another element, or an intermediate element may be provided.

(3) The characteristics in the same embodiment or different embodiments of the present invention may be mutually combined without conflict.

The foregoing detailed description of the disclosure has been presented for purposes of illustration and description. It is not intended to be exhaustive or to limit the disclosure to the precise form disclosed. Many modifications and variations are possible in light of the above teaching. The described embodiments were chosen in order to best explain the principles of the disclosure and its practical application to thereby enable the skilled in the art to best utilize the disclosure in various embodiments and with various modifications as are suited to the particular use contemplated. It is intended that the scope of the disclosure be defined by the claims appended hereto.

The application claims priority to the Chinese patent application No. 201811257793.X, filed Oct. 26, 2018, the disclosure of which is incorporated herein by reference as part of the application.

The invention claimed is:

1. A light guide assembly, comprising: a first prism sheet, a dielectric layer and a second prism sheet which are sequentially laminated along a first direction,
wherein a light refractive index of the dielectric layer is smaller than a light refractive index of the first prism sheet and a light refractive index of the second prism sheet;
the first prism sheet includes a light incident side surface, and a first plane and a first prism surface which are opposite to each other, the first plane is closer to the dielectric layer with respect to the first prism surface, and the first prism surface includes a plurality of first prism portions extending along a second direction;
the second prism sheet includes a second plane and a second prism surface which are opposite to each other, the second plane is closer to the dielectric layer with respect to the second prism surface, the second prism surface includes a plurality of second prism portions extending along the second direction, and the second prism portion has a reflection surface;
the first prism sheet is configured to receive light being incident to the light incident side surface, totally reflect light with an included angle not smaller than a first angle with a surface of the dielectric layer by the first prism portion, and reduce an included angle between the light being totally reflected and the first direction;
the second prism sheet is configured to enable light incident to the second prism portion through the second plane to be reflected towards the first direction by the reflection surface of the second prism portion and emerge from the first prism surface;
wherein the second direction is parallel to the light incident side surface, and the first angle is a total reflection critical angle between the first prism sheet and the dielectric layer;
the plurality of second prism portions are continuously disposed on the second prism surface;
a main cross-section of the second prism portion is of a triangle shape;
the second prism portion includes a third sub prism surface; and
the third sub prism surface is configured as the reflection surface, a vertex of an included angle $\alpha_3$ between a plane where the third sub prism surface is positioned and the second plane is away from the light incident side surface, and the included angle $\alpha_3$ is calculated by a formula below:

$$\alpha 3 = \frac{1}{2}\arcsin\left[\frac{n1}{n3} \times \sin\left(\arcsin\left(\frac{n2}{n1}\right) - \alpha 1\right)\right]$$

where n1 represents a refractive index of the first prism sheet, n2 represents a refractive index of the dielectric layer, n3 represents a refractive index of the second prism sheet, and $\alpha 1$ is an included angle between the first sub prism surface and the first plane.

2. The light guide assembly according to claim 1, wherein the first prism portion includes a first prism portion surface positioned on a side of the first prism sheet, which is away from the dielectric layer, a first included angle between a tangent plane at each point in the first prism portion surface and the first plane is $\gamma 1$, where $0°<\gamma 1\leq 10°$, and a vertex of the first included angle is away from the light incident side surface.

3. The light guide assembly according to claim 2, wherein the first prism portion surface is an inclined plane or a curved surface; or
the first prism portion surface includes a plurality of inclined plane portions, and two adjacent inclined plane portions in the plurality of inclined plane portions have different first included angles.

4. The light guide assembly according to claim 2, wherein the first prism portion further includes a second prism portion surface intersecting with the first prism portion surface, a second included angle between a tangent plane at each point in the second prism portion surface and the first plane is $\gamma 2$, where $15°<\gamma 2\leq 90°$, and a vertex of the second included angle is close to the light incident side surface.

5. The light guide assembly according to claim 2, wherein
the first prism surface further includes a plurality of first plane portions, each of the plurality of first plane portions is positioned between the adjacent first prism portions.

6. The light guide assembly according to claim 2, wherein the first prism portion is of a block shape, and an arrangement density of the first prism portion is increased along a direction away from the light incident side surface.

7. The light guide assembly according to claim 5, wherein the first prism portion is of a strip shape,
at least one of at least two first prism portions and at least two first plane portions is different in width in a third direction, wherein the third direction is perpendicular to the second direction.

8. The light guide assembly according to claim 2, wherein a main cross-section of the first prism portion along the first direction is of a triangle shape.

9. The light guide assembly according to claim 8, wherein the first prism portion surface is a first sub prism surface, the first prism portion further includes a second sub prism surface, the second sub prism surface intersects with the first sub prism surface, and an included angle $\alpha_2$ between a plane where the second sub prism surface is positioned and the first plane is $15°\leq\alpha_2\leq 90°$.

10. The light guide assembly according to claim 7, wherein in a direction which is parallel to the third direction and is away from the light incident side surface, at least one of a width of the first prism portion being gradually increased and a width of the first plane portion being gradually decreased is set.

11. The light guide assembly according to claim 1, wherein the second prism portion further includes a fourth sub prism surface, the fourth sub prism surface intersects with the third sub prism surface, and an included angle $\alpha_4$ between a plane where the fourth sub prism surface is positioned and the second plane is $30°\leq\alpha_4\leq 90°$.

12. The light guide assembly according to claim 1, wherein a material of the dielectric layer includes an optical clear adhesive, and a refractive index of the first prism sheet and a refractive index of the second prism sheet are identical.

13. A light collimation assembly, comprising:
the light guide assembly according to claim 1, and
a collimation part, laminated with the light guide assembly along the first direction and arranged on a side of the light guide assembly where the first prism sheet is arranged,
wherein the collimation part is configured to receive light emerging from the first prism sheet of the light guide assembly, collimate a portion of the light, which is propagated along the second direction, towards the first direction and enable the collimated light to emerge.

14. The light collimation assembly according to claim 13, wherein the collimation part includes a grating layer, the grating layer includes a grating strip extending in a third direction, and the grating layer is arranged on a side of the collimation part, which is close to the light guide assembly, or a side of the collimation part, which is away from the light guide assembly, wherein the third direction is perpendicular to the second direction.

15. The light collimation assembly according to claim 14, wherein
 a cross section of the grating strip along the second direction is of a trapezoid shape, and a side surface of the grating strip has a reflection layer; or,
 a cross section of the grating strip along the second direction is of a rectangle shape, and a material of the grating strip is a light absorption material.

16. A backlight module, comprising:
the light guide assembly according to claim 1; and
a light source, which is arranged on a side of the first prism sheet where the light incident side surface is positioned.

17. A display device, comprising the backlight module according to claim 16.

* * * * *